US008544700B2

(12) United States Patent
Chen et al.

(10) Patent No.: US 8,544,700 B2
(45) Date of Patent: Oct. 1, 2013

(54) EPOXY INJECTION CONTROLLER

(75) Inventors: David Zhi Chen, Richardson, TX (US); Mark Anthony Ali, Cockeysville, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 673 days.

(21) Appl. No.: 12/651,889

(22) Filed: Jan. 4, 2010

(65) Prior Publication Data

US 2011/0163115 A1 Jul. 7, 2011

(51) Int. Cl.
*B65D 88/54* (2006.01)
*G01F 11/00* (2006.01)
*B67D 7/60* (2010.01)

(52) U.S. Cl.
USPC ............ 222/340; 222/323; 222/324; 222/391

(58) Field of Classification Search
USPC .................. 222/79, 391, 323, 340, 324, 336; 604/59–61, 208, 209, 211, 224, 228, 232, 604/233
See application file for complete search history.

(56) References Cited

U.S. PATENT DOCUMENTS 1,630,846 A * 5/1927 Holst ............................ 222/323
1,718,596 A * 6/1929 Smith ........................... 604/223
2,175,601 A * 10/1939 Grund ........................... 222/323
2,624,338 A * 1/1953 Moore et al. .................. 604/223
2,892,457 A * 6/1959 Sturtz ........................... 604/223
3,141,583 A * 7/1964 Mapel et al. .................. 222/309
3,443,725 A * 5/1969 Lawhorn ......................... 222/79
3,744,921 A * 7/1973 Weller et al. ...................... 401/2
4,339,058 A * 7/1982 Wendt ........................... 222/309
4,368,732 A * 1/1983 Cassou et al. ................. 604/209
4,472,141 A * 9/1984 Dragan ........................... 433/90
4,669,636 A * 6/1987 Miyata ..................... 222/153.01
4,762,515 A * 8/1988 Grimm ............................ 604/61
4,975,686 A * 12/1990 Delcourt ....................... 340/659
5,375,740 A * 12/1994 Umetsu et al. .................. 222/95
5,397,029 A * 3/1995 West ............................... 222/79
5,400,925 A * 3/1995 Simmen ........................ 222/137
5,881,928 A * 3/1999 Register et al. ............... 222/340
7,624,898 B2 * 12/2009 Hornsby et al. ........... 222/383.2
2005/0090781 A1 * 4/2005 Baba et al. .................... 604/209
2007/0119865 A1 * 5/2007 Belanger et al. ........... 222/146.5
2008/0060970 A1 * 3/2008 Wheeler et al. ............... 206/570
2009/0275900 A1 * 11/2009 Hetherington ................ 604/208

* cited by examiner

*Primary Examiner* — Paul R Durand
*Assistant Examiner* — Vishal Pancholi

(57) ABSTRACT

An epoxy injection controller including a housing having a housing body and a handle, the housing body having a front wall, opposing side walls, a bottom wall, and a rear wall, and the handle having a front wall. A cartridge holder configured to receive a cartridge of material is disposed within the housing. A trigger having a first end and a second end is rotatable between a locked position and an unlocked position. A rotatable link member having a first end and a second end is disposed within the housing, and is in engagement with the trigger. An actuator for dispensing material from the cartridge is selectively engaged with the link member. The actuator dispenses material from the cartridge when the trigger is unlocked, and the actuator is retracted from the cartridge and prevented from dispensing material from the cartridge when the trigger is locked.

20 Claims, 11 Drawing Sheets

EPOXY INJECTION CONTROLLER

BACKGROUND

When routing communication-based media including cable, wires and strands, connectors are often used to connect one piece of media to another. For example, in fiber optic terminations, fibers may be bonded to ferrules to connect two fibers together. An epoxy is typically applied through a syringe to bond the fibers to the ferrule. Upon depression of the plunger of a syringe, the epoxy flows from the syringe to the ferrule. Because of epoxy viscosity and compressibility, epoxy may continue to flow out from the syringe even after depression of the plunger has ceased. To prevent such continued flow of epoxy, the operator typically pulls the plunger back. However, it is difficult to control the distance the plunger is pulled back, and pulling the plunger too far back can introduce air bubbles into the epoxy contained within the syringe, thereby contaminating the epoxy.

DETAILED DESCRIPTION

Figure 1:
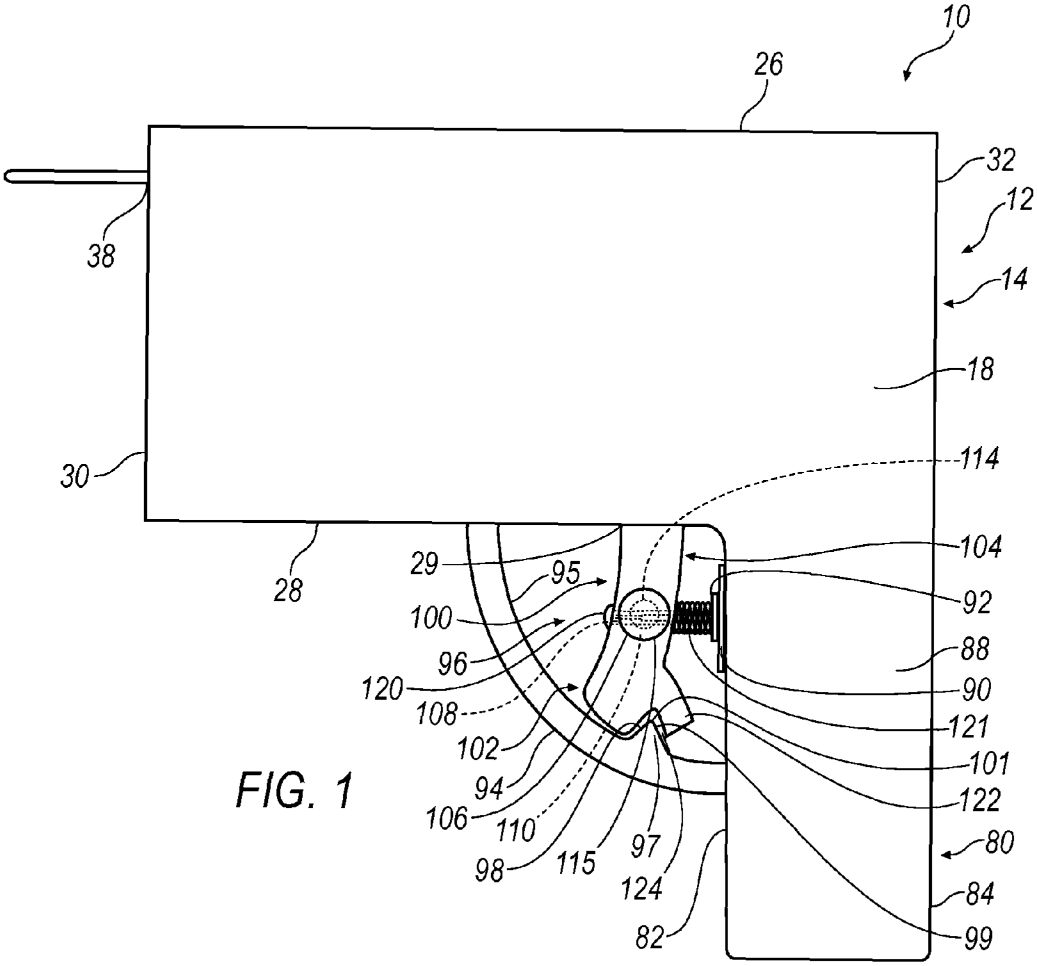
FIG. 1 is a planar view of an epoxy injection controller.
Figure 2:
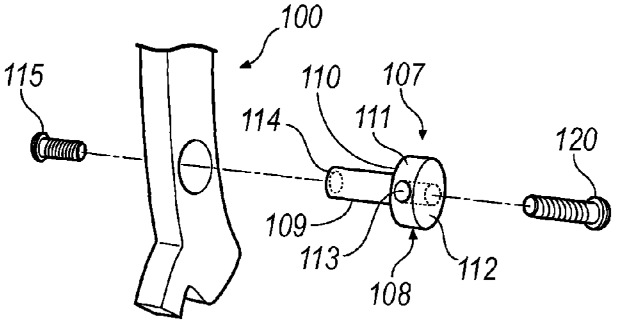
FIG. 2 is an exploded view of the trigger of the epoxy injection controller of FIG. 1.
Figure 3:
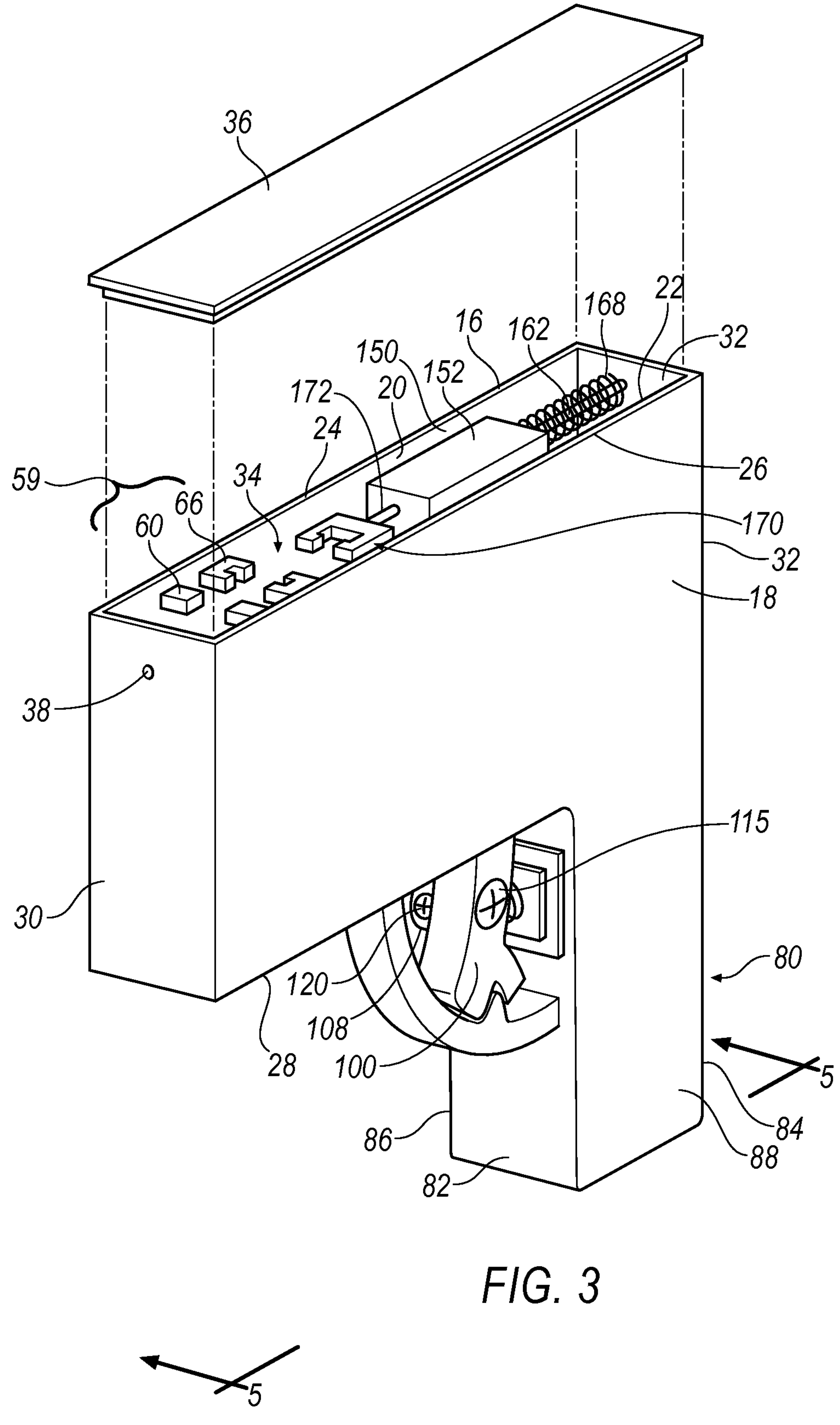
FIG. 3 is a perspective view of the epoxy injection controller of FIG. 1.

Referring now to the discussion that follows and also to the drawings, illustrative approaches to the disclosed apparatuses and methods are shown in detail. Although the drawings represent some possible approaches, the drawings are not necessarily to scale and certain features may be exaggerated, removed, or partially sectioned to better illustrate and explain the disclosed device. Further, the descriptions set forth herein are not intended to be exhaustive or otherwise limit or restrict the claims to the precise forms and configurations shown in the drawings and disclosed in the following detailed description.

As seen in FIGS. 1-5, epoxy injection controller 10 is configured to deliver a controlled amount of epoxy to a desired location. Epoxy controller 10 can be used to deliver epoxy to a connector or ferrule to bond communication-based media such as fiber optic cables, coaxial cables, wires or strands to the ferrule. Epoxy injection controller 10 includes a housing 12, a trigger 100, a link member 130, and an actuator 150. Epoxy injection controller 10 delivers epoxy such that the flow of epoxy from the epoxy injection controller 10 can be stopped, while controlling leaking of epoxy from a cartridge 40 received by the epoxy injection controller 10.

In the exemplary illustration shown in FIGS. 1-5, housing 12 includes a housing body 14 and a handle 80. Housing body 14 has a generally rectangular cross section, and includes a pair of opposing side walls 16, 18 having inner surfaces 20, 22 and top edges 24, 26 respectively, a bottom wall 28, a front wall 30, and a rear wall 32, all of which define a housing chamber 34 inside the housing body 14. A cover 36 may be detachably or removably connected to the top edges 24, 26 of the side walls 16, 18 to allow access into the housing chamber 34. The cover 36 may be attached to the side walls 16, 18 in any suitable manner, including, but not limited to, hingedly attaching the cover 36 to the top edges 24, 26 of the side walls 16, 18 or slideably engaging the cover 36 with tracks disposed along the top edges 24, 26. The front wall 30 of housing body 14 may include a needle aperture 38 configured to receive the needle of a cartridge 40 as discussed below.

Figure 4:
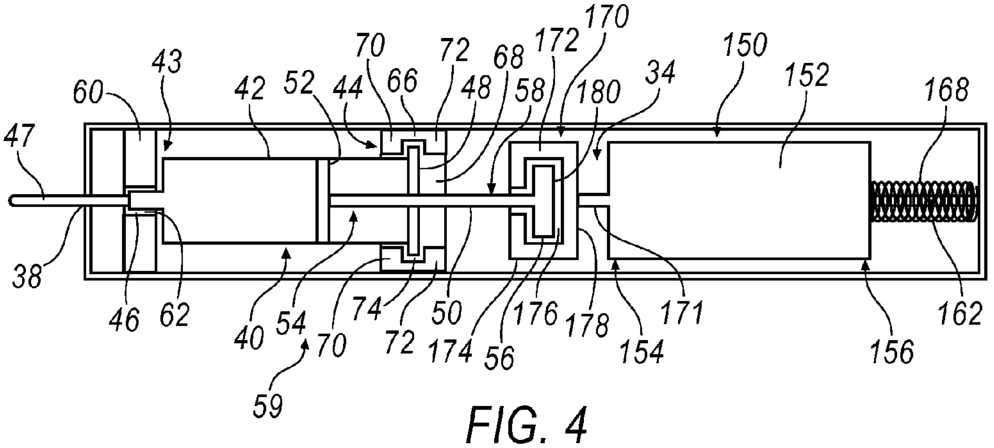
FIG. 4 is a top view of the epoxy injection controller of FIG. 1 after a cartridge has been loaded into the epoxy injection controller.

As shown in FIG. 4, cartridge 40 may be a syringe including a barrel 42 having a first end 43 and a second end 44. Barrel 42 is a generally cylindrical hollow tube having a generally uniform diameter. Barrel 42 may include a tip 46 having a diameter smaller than the diameter of the barrel 42 at the first end 43 of the barrel 42, and a needle 47 extending from the tip 46. Barrel 42 may also include a barrel base 48 having a diameter greater than the diameter of the barrel 42 at the second end 44. Cartridge 40 also includes a plunger 50 configured to be received within barrel 42, including a plunger tip 52 at a first end 54 of the plunger 50, and a plunger base 56 at a second end 58 of the plunger 50. Cartridge 40 may be filled with a number of substances, including, but not limited to, an epoxy.

A cartridge holder 59 including a first cartridge retainer 60 and a second cartridge retainer 66 may extend from the inner surfaces 20, 22 of the side walls 16, 18 proximate the top edges 24, 26 of the side walls 16, 18 and proximate the front wall 30. First cartridge retainer 60 may include a generally U-shaped recess 62 sized and configured to receive the tip 46 of cartridge 40. Second cartridge retainer 66 may include a generally U-shaped recess 68 sized and configured to receive the second end 44 of cartridge 40. Second cartridge retainer 66 may include two sets of opposing shoulders 70, 72 in the generally U-shaped recess 68 defining a barrel base recess 74. Barrel base recess 74 is sized and configured to receive the barrel base 48 of cartridge 40.

Inserting a cartridge 40 into the epoxy injection controller 10 includes placing the tip 46 at the first end 43 of the cartridge 40 into the recess 62 of the first cartridge retainer 60 such that the needle 47 of cartridge 40 extends through the needle aperture 38 in the housing body 14. The second end 44 of cartridge 40 is placed into the recess 68 of the second cartridge retainer 66 such that the barrel base 42 is disposed in the barrel base recess 74 between the pairs of shoulders 70, 72. In this manner, cartridge 40 is kept in place within the housing body 14.

Referring back to FIG. 1, handle 80 may have a generally rectangular cross section, and includes a front wall 82, a rear wall 84, and a pair of opposing side walls 86, 88. Front wall 82 of handle 80 extends from, and is generally perpendicular to, the bottom wall 28 of housing body 14. Rear wall 84 of handle 80 extends from, and is generally planar with, the rear wall 32 of housing body 14. Opposing side walls 86, 88 extend from, and are generally planar with, the opposing side walls 16, 18 of housing body 14. In the illustrated approach, housing 12 ends up being generally L-shaped with the configuration of housing body 14 and handle 80.

A track 90 may be disposed on the front wall 82 of the handle 80 and extend generally perpendicular to the bottom wall 28 of housing body 14. Track 90 may be configured to receive a spring mount 92, such that the spring mount 92 is slideably engaged within the track 90.

Figure 5:
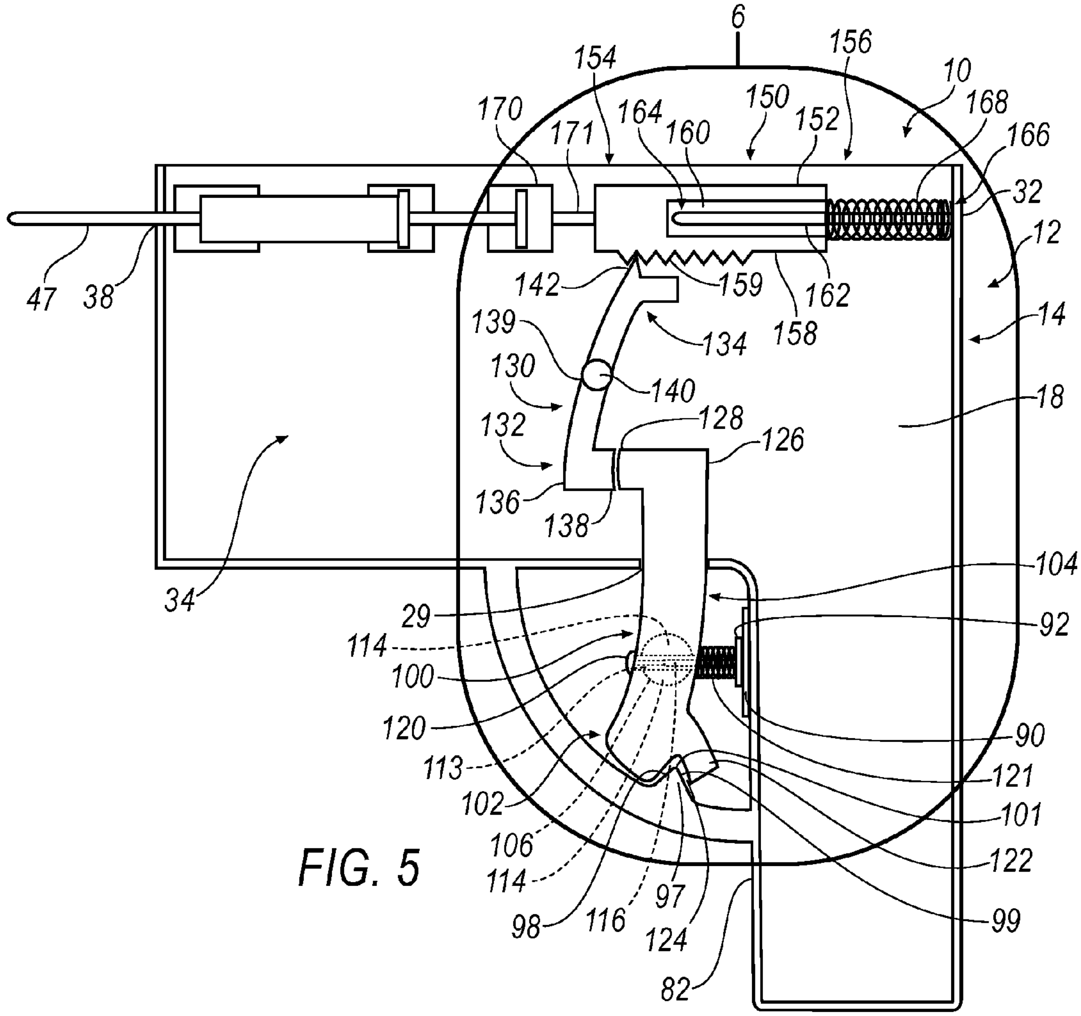
FIG. 5 is a cross-sectional view of the epoxy injection controller of FIG. 1 along line 5-5.

As shown in FIGS. 1 and 5, a generally curved trigger guard 94 having an inner surface 95 may extend from the bottom wall 28 of the housing body 14 to the front wall 82 of the handle 80, below the track 90. A trigger guard 94, bottom wall 28 of housing body 14, and front wall 82 of handle 80 define a trigger chamber 96. In some approaches, chamber 96 may not include all of the indicated elements. For example, a trigger guard may be eliminated. The portion of the bottom wall 28 of housing body 14 defining trigger chamber 96 may include an aperture 29 configured to receive a trigger 100 as discussed below. At least one tooth 97 having a front surface 98 and a rear surface 99 may be disposed on the inner surface 96 of the trigger guard 94 when such a guard is used.

As shown in FIGS. 1, 2 and 5-7, epoxy injection controller 10 may include a trigger 100 disposed within trigger chamber 96. Trigger 100 includes a first end 102 and a second end 104, and a trigger bore 106 extending through the trigger 100. Trigger 100 may also include a trigger guide 107, including a trigger guide base 108 and a trigger guide pivot member 109. Trigger bore 106 is sized and configured to receive trigger guide pivot member 109, such that trigger 100 can rotate about the trigger guide pivot member 109.

Trigger guide base 108 may be generally disc shaped, having a front surface 110, a rear surface 112, and an outer surface 111 defined between the front surface 110 and the bottom surface 112. Trigger guide pivot member 109 may be a generally tubular member extending from the front surface 110 of trigger guide base 108, and may include a trigger guide pivot bore 114 generally parallel to the trigger bore 106. Trigger guide pivot bore 114 is sized and configured to receive a trigger fastener 115, such as a screw, to fasten the trigger guide base 108 to the trigger 100. Trigger guide base 108 may include a trigger guide bore 113 generally perpendicular to the trigger guide pivot bore 114 through the outer surface 111.

Trigger guide bore 113 is sized and configured to receive a guide member 116, which may have a generally cylindrical cross-section and may be flexible. Guide member 116 includes a first end 117 and a second end 118, and the second end 118 may be connected to spring mount 92 received in track 90 on the front wall 82 of handle 80. The first end 117 of guide member 116 may be received in trigger guide bore 113 such that the trigger guide base 108 may translate along the guide member 116. The first end 117 of guide member 116 may include a guide member bore 119 sized and configured to receive an adjustment fastener 120, such as a screw, to fasten guide member 116 to trigger guide base 108. An adjustment spring 121 may be disposed about guide member 116 and connected on one end to the trigger guide base 108 and on the other end to spring mount 92.

The first end 102 of trigger 100 may include a finger 122 projecting from trigger 100, such that a cavity 124 is defined between the first end 102 of trigger 100 and finger 122. When used, cavity 124 is sized and configured such that cavity 124 is generally complimentary to tooth 97 disposed on trigger guard 94. The second end 104 of trigger 100 extends through aperture 29 into housing body 14, and may include a trigger arm 126 having a rounded end 128.

Figure 6:
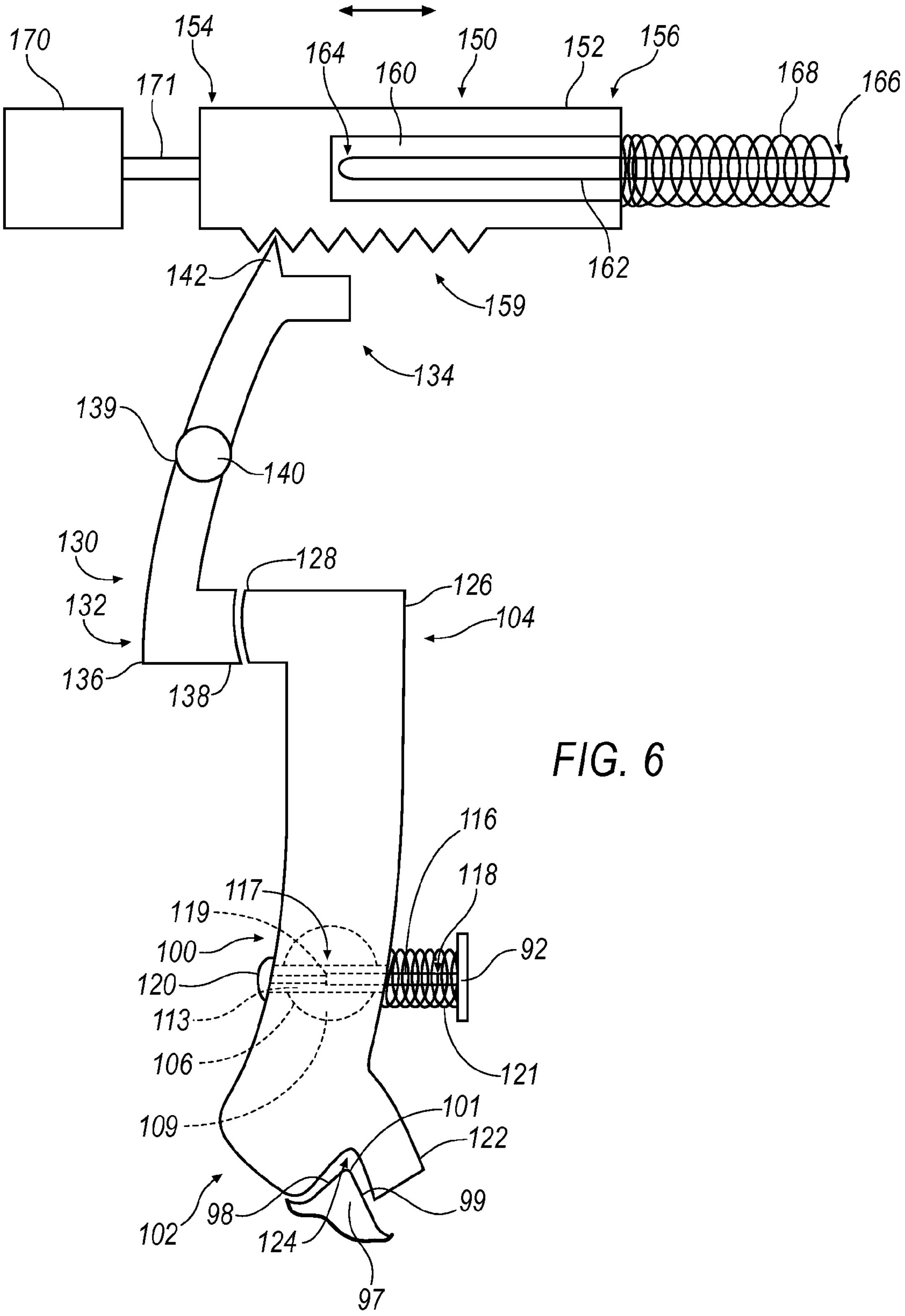
FIG. 6 is an exploded cross-sectional view of the components contained within the epoxy injection controller of FIG. 1 with the trigger in the locked position.

Pulling the first end 102 of trigger 100 toward the handle 80 causes trigger 100 to rotate in a counter-clockwise direction about trigger guide pivot member 109. When finger 122 contacts front surface 98 of tooth 97, the pulling of trigger 100 towards handle 80 causes adjustment spring 121 to compress horizontally and give slightly in the vertical direction, such that spring mount 92 slides in track 90 toward housing body 14. The movement of spring mount 92 towards the housing body 14 allows trigger 100 to also translate towards housing body 14. The compression of adjustment spring 121 allows trigger guide 107 to translate along guide member 116, thus translating trigger 100 towards the handle 80. As trigger 100 translates towards housing body 14 and handle 80, finger 122 advances along an inclined front surface 98 of tooth 97 towards inclined rear surface 99. Surfaces 98 and 99 define an apex 101 therebetween. After finger 122 of trigger 100 travels beyond the front surface 98 of tooth 97 over the apex 101, trigger 100 is released, such that it 100 translates away from housing body 14. Finger 122 slides down along rear surface 99 of tooth 97, such that tooth 97 is engaged within cavity 124, with apex 101 adjacent a corresponding valley of cavity 124. The engagement of tooth 97 within cavity 124 locks trigger 100 from further rotational and translational movement as shown in FIG. 6.

When trigger 100 is in the locked position, pulling the second end 104 of trigger 100 toward handle 80 causes adjustment spring 121 to compress horizontally and give slightly in the vertical direction, such that finger 122 advances along rear surface 99 of tooth 97 toward front surface 98. After finger 122 advances beyond the rear surface 99 of tooth 97 over apex 101 and down inclined surface 98, trigger 100 may then rotate in a clockwise direction about trigger guide pivot member 109 as shown in FIG. 7.

A link member 130 having a first end 132 and a second end 134 may be disposed within housing body 14. The first end 132 of link member 130 includes a link arm 136 that has a rounded end 138, and which selectively abuts a complimentary rounded end 128 of the trigger arm 126. Link member 130 includes a link member bore 139 extending through the link member 130. Link member bore 139 is sized and configured to receive a pivot member 140, such that link member 130 can rotate about pivot member 140. Pivot member 140 may be a generally cylindrical tube, and may be connected to the inner surfaces 20, 22, of housing body 14. The second end 134 of link member 130 may include a projection 142 for selective engagement with an actuator 150 as discussed below.

When trigger 100 rotates about trigger guide pivot member 109 in a counter-clockwise direction, the rounded end 128 of trigger arm 126 rotates into the rounded end 138 of link arm 136 such that link member 130 is forced to rotate clockwise about pivot member 140. Rotating the trigger 100 about trigger guide pivot member 109 in a clockwise direction causes link member 130 to rotate counter-clockwise about pivot member 140.

Figure 7:
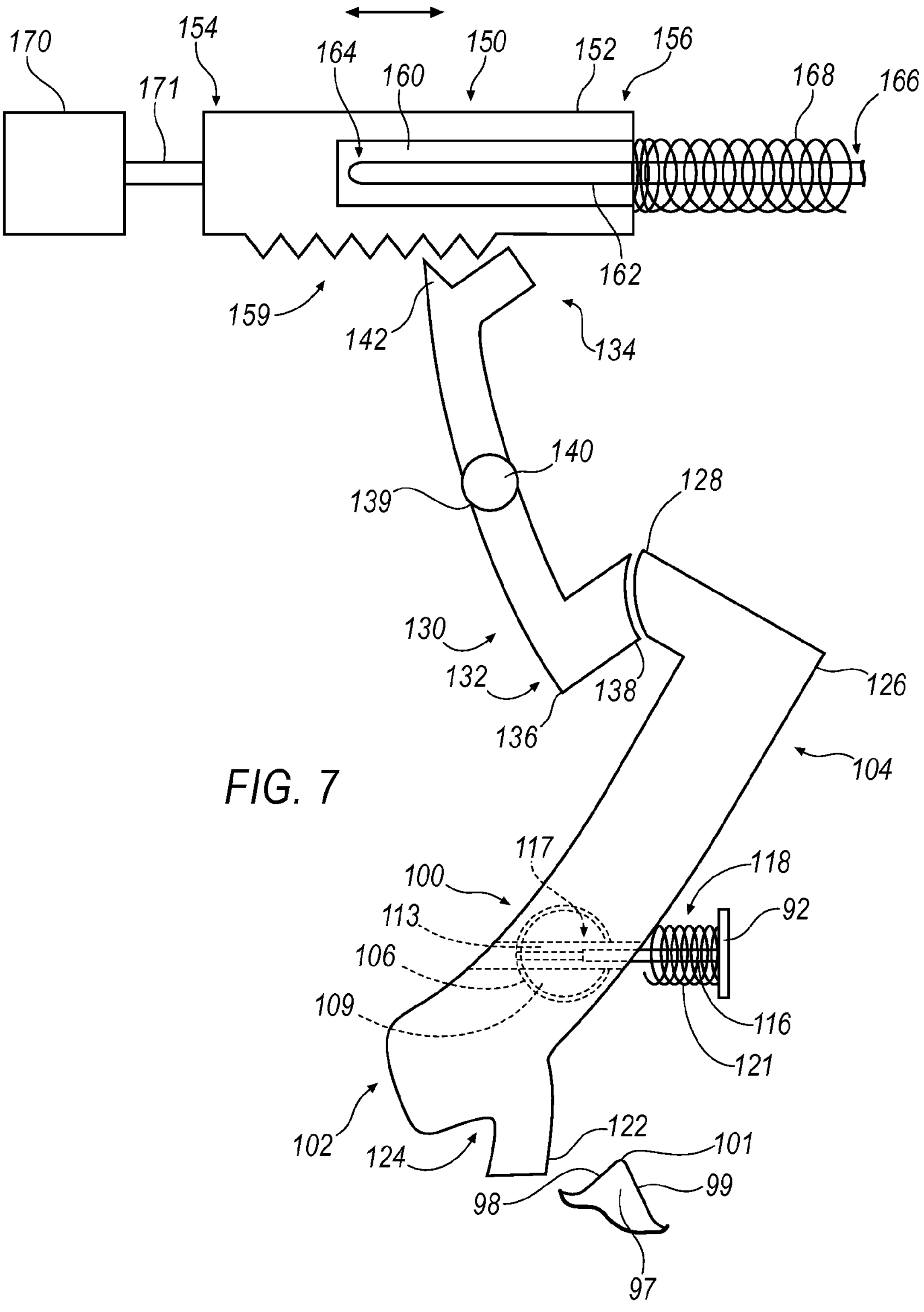
FIG. 7 is an exploded cross-sectional view of the components contained within the epoxy injection controller of FIG. 1 with the trigger in the unlocked position.

As shown in FIGS. 5-7, an actuator 150 may be disposed in the housing body 14 proximate the top edges 24, 26 of the side walls 16, 18. The actuator 150 may include a slide member 152 having a first end 154, a second end 156, and a bottom surface 158. A plurality of teeth 159 may be disposed on the bottom surface 158 of slide member 152 for selective engagement with the projection 142 of link member 130. An axial bore 160 may extend through slide member 152 from the first end 154 to the second end 156. Axial bore 160 may be sized and configured to receive a slide guide 162, which may be a generally cylindrical tube having a first end 164 and a second end 166. The second end 166 of slide guide 162 may be connected to the rear wall 32 of housing body 14. A spring 168 may be disposed about the slide guide 162 and connected on one end to the second end 156 of slide member 152 and the other end to the rear wall 32 of housing body 14. The first end 164 of slide guide 162 may be received in axial bore 160 such that slide member 152 may translate along the slide guide 162.

A plunger carrier 170 may be connected to the first end 154 of slide member 152 by a connection member 171. Plunger carrier 170 includes side walls 172, 174, base 176, rear wall 178, and a plunger base cavity 180 defined by the side walls 172, 174, base 176 and rear wall 178. Plunger base cavity 180 is sized and configured to receive the plunger base 56 of cartridge 40 when cartridge 40 is inserted into the housing body 14. A pair of shoulders 182, 184 may extend from the side walls 172, 174 such that plunger base 56 can only exit plunger base cavity 180 by being lifted out of the plunger base cavity 180.

When link member 130 is rotated clockwise about pivot member 140, projection 142 is brought into engagement with one of teeth 159 on the slide member 152. As link member 130 continues to rotate clockwise, projection 142 forces slide member 152 to translate along slide guide 162 toward the rear wall 32 of housing body 14, compressing the spring 168. The translation of slide member 152 towards the rear wall 32 of housing body 14 causes plunger carrier 170 to also translate towards the rear wall 32. When link member 130 is rotated counter-clockwise about pivot member 140, projection 142 also rotates counter-clockwise about pivot member 140. As projection 142 rotates away from rear wall 32, the tension experienced by slide member 152 from the compression of spring 168 forces slide member 152, and plunger base cavity 180, to translate against projection 142 away from the rear wall 32 and toward cartridge 40. As slide member 152 advances toward cartridge 40, teeth 159 may contact, but not engage with, projection 142 due to the rotation of projection 142 away from rear wall 32. Rotating link member 130 clockwise about pivot member 40 rotates projection 142 into engagement with a tooth 159 closer to the second end 156 of slide member 152, stopping the translation of the slide member 152 towards cartridge 40. Continued clockwise rotation of link member 130 forces projection 142 against tooth 159, causing slide member 152 to translate along slide guide 162 toward rear wall 32. As plunger carrier 170 is connected to slide member 152, plunger carrier 170 also translates toward read wall 32, retracting plunger base 56 contained within plunger carrier 170 from cartridge 40.

In operation, slide member 152 is first drawn along slide guide 162 towards the rear wall 32 of housing body 14, compressing the spring 168 between the slide member 152 and the rear wall 32 placing the slide member 152 under tension. Slide member 152 may be drawn towards rear wall 32 and placed under tension manually, or by another other suitable tensioning mechanism. While slide member 152 is held under tension by the tensioning mechanism, the first end 102 of trigger 100 is pulled toward the handle 80, compressing adjustment spring 121 and rotating trigger 100 counter-clockwise about trigger guide pivot member 109. The rotation of trigger 100 about trigger guide pivot member 109 causes link member 130 to rotate clockwise about pivot member 140, which draws projection 142 into engagement with one of teeth 159 on slide member 152. When trigger 100 rotates counter-clockwise about pivot member 110 such that trigger cavity 124 is brought into engagement with tooth 97 on trigger guard 94, trigger 100 is locked and prevented from further movement. The locking of trigger 100 locks link member 130 from further rotation about pivot member 140 and also locks projection 142 into engagement with a mating tooth 159, which prevents slide member 152 from translating toward the front wall 30 of housing body 14. Thus, slide member 152 and spring 168 are locked under compression against rear wall 32.

Next, a cartridge 40 is inserted or loaded into the epoxy injection controller 10 such that the needle 47 of cartridge 40 extends through the needle aperture 38 in housing body 14, the tip 46 of cartridge 40 is placed into the first cartridge retainer 60, the barrel base 48 of cartridge 40 is placed into the second cartridge retainer 66, and the plunger base 56 is placed into the plunger carrier 170. The cartridge 40 contains any of a number of substances, including an epoxy.

After the cartridge 40 has been loaded, the epoxy injection controller 10 is brought to the delivery site for the epoxy such that the needle 47 of the cartridge 40 is proximate the delivery site. The second end 104 of the trigger 100 is then pulled towards the handle 80 such that the trigger 100 is released from engagement with the tooth 97 on the trigger guard 94, and the trigger rotates in a clockwise direction about the trigger guide pivot member 109. As the trigger 100 is no longer locked, the link member 130 is unlocked, and free to rotate about pivot member 140. The tension provided by spring 168 to slide member 152 forces link member 130 and projection 142 to rotate counter-clockwise about pivot member 140. The tension experienced by slide member 152 from the compression of spring 168 forces slide member 152 to translate against projection 142 along slide guide 162 and away from rear wall 32 and towards cartridge 40. As plunger carrier 170 is connected to slide member 152, plunger carrier 170 also translates away from the rear wall 32, and towards the cartridge 40. This forces the depression of plunger 50 within barrel 42 such that epoxy begins to flow from needle 47 to the delivery site.

When a sufficient quantity of epoxy has been delivered to the delivery site, the first end 102 of trigger 100 may again be pulled towards the handle 80 and rotated counter-clockwise about trigger guide pivot member 109. Link member 130 is forced by the rotation of trigger 100 to rotate clockwise about pivot member 140, drawing projection 142 into engagement with a tooth 159 closer to the second end 156 of slide member 152. The engagement of the projection 142 and tooth 159 arrests the translation of the slide member 152 and plunger carrier 170 towards the cartridge 40. Further clockwise rotation of link member 130 forces projection 142 into tooth 59, which retracts the slide member 152 along the slide guide 162 towards the rear wall 32 of housing body 14, and thus also retracts plunger carrier 170 away from the cartridge 40, effectively stopping the flow of epoxy from the cartridge 40. Trigger 100 is then lockingly engaged with tooth 97 on trigger guard 94.

Tightening the adjustment fastener 120 into guide member 116 may increase or decrease the rate of epoxy flow from cartridge 40, as well as control the distance that slide member 130 is retracted along slide guide 162. The tighter the adjustment fastener 120, the shorter the distance that trigger guide 109 can translate along guide member 116. In this manner, the rate of epoxy flow and the distance that slide member 130 may be retracted may be controlled.

Figure 8:
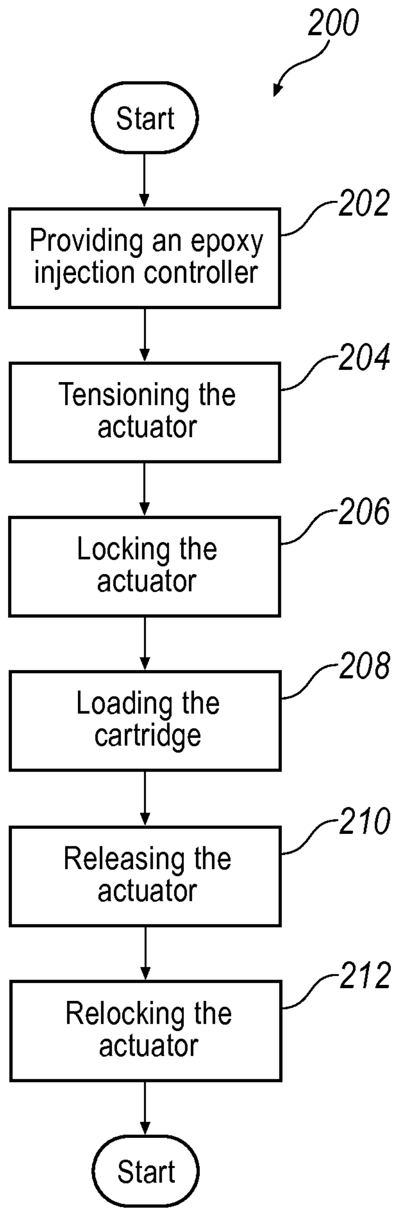
FIG. 8 illustrates an exemplary process for controlling epoxy distribution using the epoxy injection controller of FIG. 1.
Figure 9:
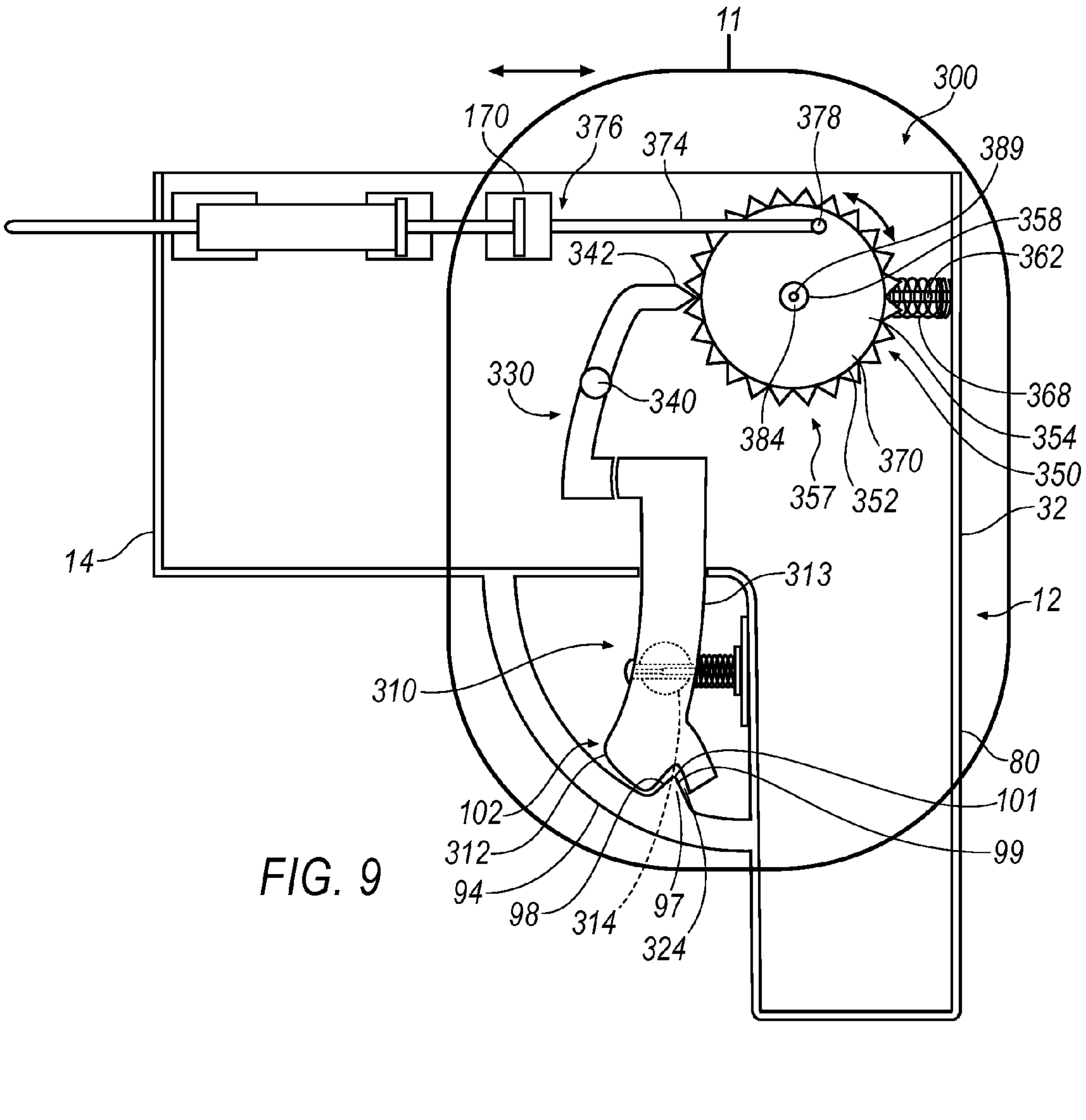
FIG. 9 is a cross-sectional view of an alternate illustration of the epoxy injection controller of FIG. 1.
Figure 10:
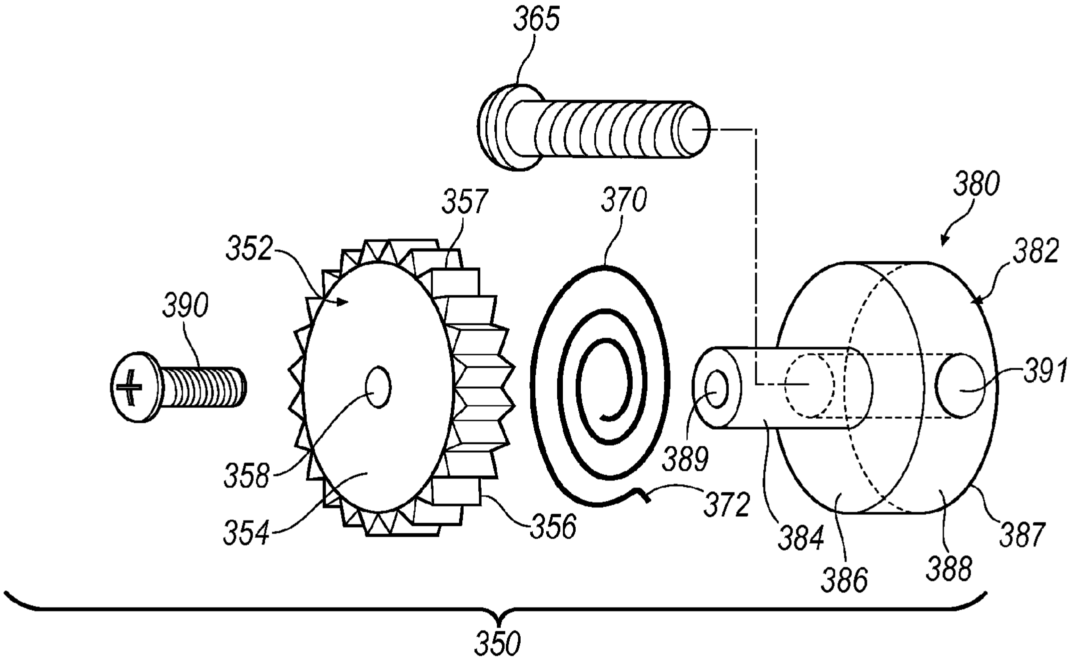
FIG. 10 is an exploded view of the actuator of the epoxy injection controller of FIG. 9.

FIG. 8 illustrates an exemplary process for controlling the delivery of epoxy.

Block 202 may include providing an epoxy injection controller 10. The epoxy injection controller 10 may include a housing 12, a releasably lockable trigger 100, a link member 130, and an actuator 150.

Block 204 may include tensioning the actuator 150. For example, slide member 152 may be drawn toward the rear wall 32 of housing body 14, compressing the spring 168 between the slide member 152 and the rear wall 32.

Block 206 may include locking the actuator 150. For example, first end 102 of trigger 100 may be pulled toward the handle 80 of the epoxy injection controller 10 and rotated counter-clockwise about trigger guide pivot member 109. The rotation of trigger 100 about trigger guide pivot member 109 causes link member 130 to rotate clockwise about pivot member 140, which draws projection 142 into engagement with one of teeth 159 on slide member 152. When trigger 100 rotates counter-clockwise about trigger guide pivot member 109 such that trigger cavity 124 is brought into engagement with tooth 97 on trigger guard 94, trigger 100 is locked and prevented from further movement. The locking of trigger 100 also locks link member 130 from further rotation about pivot member 140. Thus, slide member 152 and spring 168 are locked under tension against rear wall 32, and are prevented form translating toward the front wall 30 of housing body 14.

Block 208 may include loading the cartridge 40 into the epoxy injection controller 10. For example, the tip 46 at the first end 43 of the cartridge 40 may be placed into the recess 62 of the first cartridge retainer 60 such that the needle 47 of cartridge 40 extends through the needle aperture 38 in the housing body 14. The second end 44 of cartridge 40 may be placed into the recess 68 of the second cartridge retainer 66 such that the barrel base 42 is disposed in the barrel base recess 74 between the pairs of shoulders 70, 72. Plunger base 56 may be inserted into plunger base cavity 180.

Block 210 may include releasing the actuator 150. For example, the second end 104 of the trigger 100 may be pulled towards the handle 80 such that the trigger 100 is released from engagement with tooth 97 on the trigger guard 94, and the trigger rotates in a clockwise direction about the trigger guide pivot member 109. As the trigger 100 is no longer locked, the link member 130 is released, and free to rotate about pivot member 140. The tension provided by spring 168 to slide member 152 forces link member 130 and projection 142 to rotate counter-clockwise about pivot member 140. This allows slide member 152 to translate against projection 142 away from rear wall 32. As plunger carrier 170 is connected to slide member 152, plunger carrier 170 also translates away from the rear wall 32, and towards the cartridge 40. This forces the depression of plunger 50 within barrel 42 such that epoxy begins to flow from needle 47 to the delivery site.

Block 212 may include relocking the actuator 150. For example, when a sufficient quantity of epoxy has been delivered to the delivery site, the first end 102 of trigger 100 may again be pulled towards the handle 80 and rotated counter-clockwise about trigger guide pivot member 109. Link member 130 is forced to rotate clockwise about pivot member 140, drawing projection 142 into engagement with a tooth 159 closer to the second end 156 of slide member 152. The engagement of the projection 142 and tooth 159 arrests the translation of the slide member 152 and plunger carrier 170 towards the cartridge 40. Further clockwise rotation of link member 130 and projection 142 retracts the slide member 152 towards the rear wall 32 of housing body 14, and thus also retracts plunger carrier 170 away from the cartridge 40, effectively stopping the flow of epoxy from the cartridge 40. Trigger 100 is then lockingly engaged with tooth 97 on trigger guard 94.

The process 200 may end after block 212.

Another exemplary illustration of an epoxy injection controller 300 is shown in FIGS. 9-12. In the exemplary illustration, epoxy injection controller 300 may include a housing 12, trigger 310, link member 330, and actuator 350. Actuator 350 may include a disc 352 having a front face 354 and a rear face 356, and a disc bore 358 extending through the front and rear faces 354, 356 of disc 352. A plurality of teeth 357 may be disposed about the circumference of the disc 352. Actuator 350 may also include a disc guide 380 including a disc guide base 382 and a disc guide pivot member 384. Disc bore 358 is sized and configured to receive disc guide pivot member 384 such that disc 352 can rotate about disc guide pivot member 384.

Disc guide base 382 may be generally disc shaped, having a front surface 386, a rear surface 387, and an outer surface 388 defined between the front surface 386 and the rear surface 387. Disc guide pivot member 384 may be a generally tubular member extending from the front surface 386 of disc guide base 382, and may include a disc guide pivot bore 389 generally parallel to the disc bore 358. Disc guide pivot bore 389 may be sized and configured to receive a disc fastener 390, such as a screw, to fasten the disc guide base 382 to the disc 352. Disc guide base 382 may include a disc guide bore 391 generally perpendicular to the disc guide pivot bore 389 through the outer surface 388. Disc guide bore 391 may be sized and configured to receive a guide member 362, which may have a generally cylindrical cross-section and may be flexible. Guide member 362 includes a first end 364 and a second end 366, and second end 366 may be connected to rear wall 32 of housing body 14. The first end 364 of guide member 362 may be received in disc guide bore 391 such that the disc guide base 382 may translate along the disc guide member 362. The first end 364 of guide member 362 may include a guide member bore 363 sized and configured to receive an adjustment fastener 365, such as a screw, to fasten guide member 362 to disc guide base 382. A spring 368 may be disposed about disc guide member 362 and connected on one end to the disc guide base 382, and on the other end to the rear wall 32.

A winding spring 370 including a spring base 372 on one end of the spring may be disposed on the rear face 356 of disc 352. Spring base 372 may be connected to the front surface 386 of disc guide base 382. Winding spring 370 provides a torque to the disc 352, which urges the disc 352 to rotate in a counter-clockwise direction.

Disc 352 may also include a connection member 374 having a first end 376 and a second end 378. Second end 378 may be pivotally connected to the front face 354 of disc 352, and first end 376 may be connected to the plunger carrier 170.

Figure 11:
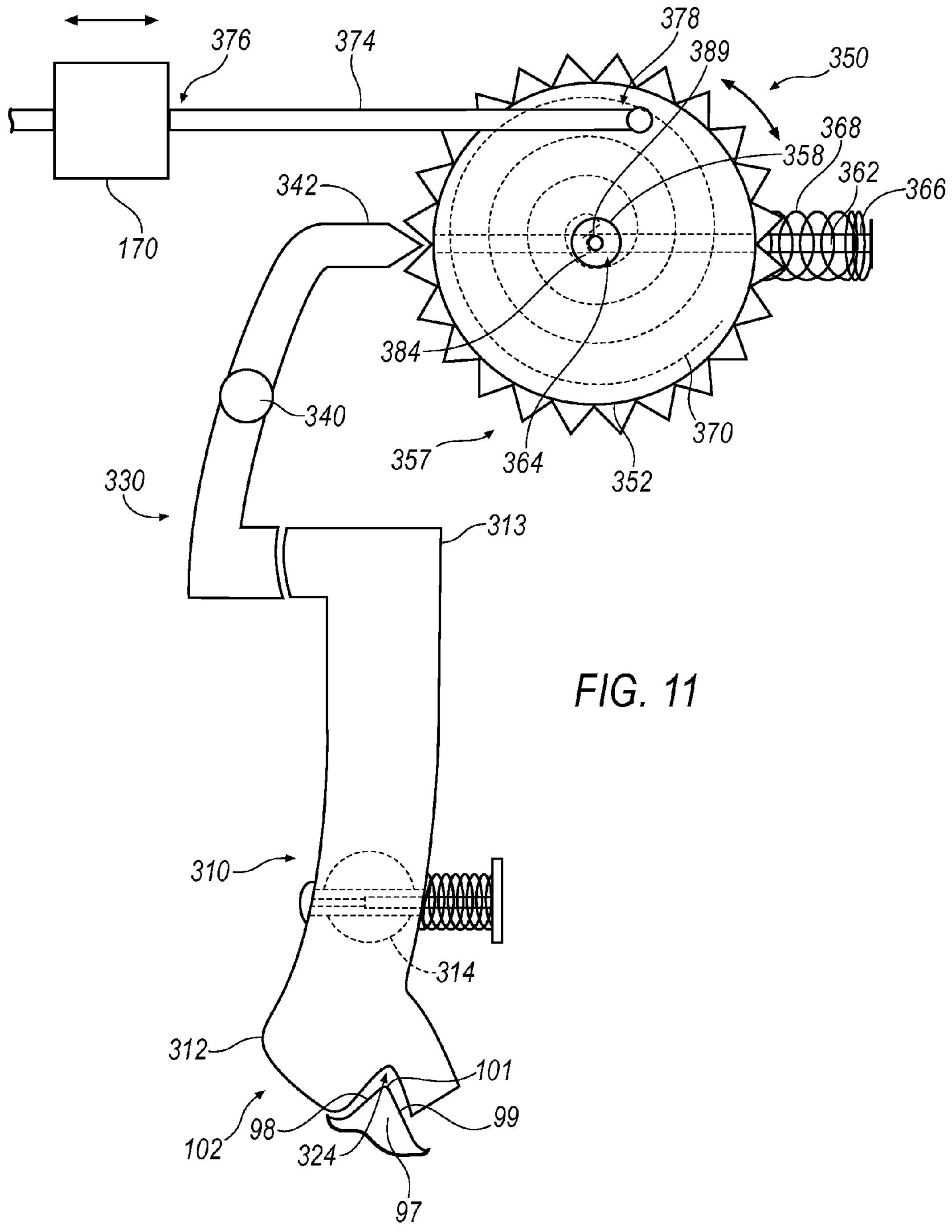
FIG. 11 is an exploded cross-sectional view of the components contained within the epoxy injection controller of FIG. 9 with the trigger in the locked position.

In operation, disc 352 is wound in a clockwise manner, tensioning winding spring 370. Disc 352 may be wound by any suitable winding mechanism, including, but not limited to manually winding the disc directly, using a key to wind the disc, and electronically winding the disc. While disc 352 is held by the winding mechanism such that winding spring 370 is under tension, the first end 312 of trigger 310 is pulled toward the handle 80 and rotated counter-clockwise about trigger guide pivot member 314. Trigger 310 operates in substantially the same manner as trigger 100 shown in FIGS. 5-7. The rotation of trigger 310 about trigger guide pivot member 314 causes link member 330 to rotate clockwise about pivot member 340, which draws projection 342 into engagement with one of teeth 357 on disc 352. When trigger 310 rotates counter-clockwise about trigger guide pivot member 314 such that trigger cavity 324 is brought into engagement with tooth 97 on trigger guard 94, trigger 310 is locked and prevented from further movement as shown in FIG. 11. The locking of trigger 310 locks link member 330 from further rotation about pivot member 340. As link member 330 is prevented from rotating counter-clockwise about pivot member 340, projection 342 prevents the torque exerted upon disc 352 by winding spring 370 from rotating disc 352 counter-clockwise about disc guide pivot member 384.

Figure 12:
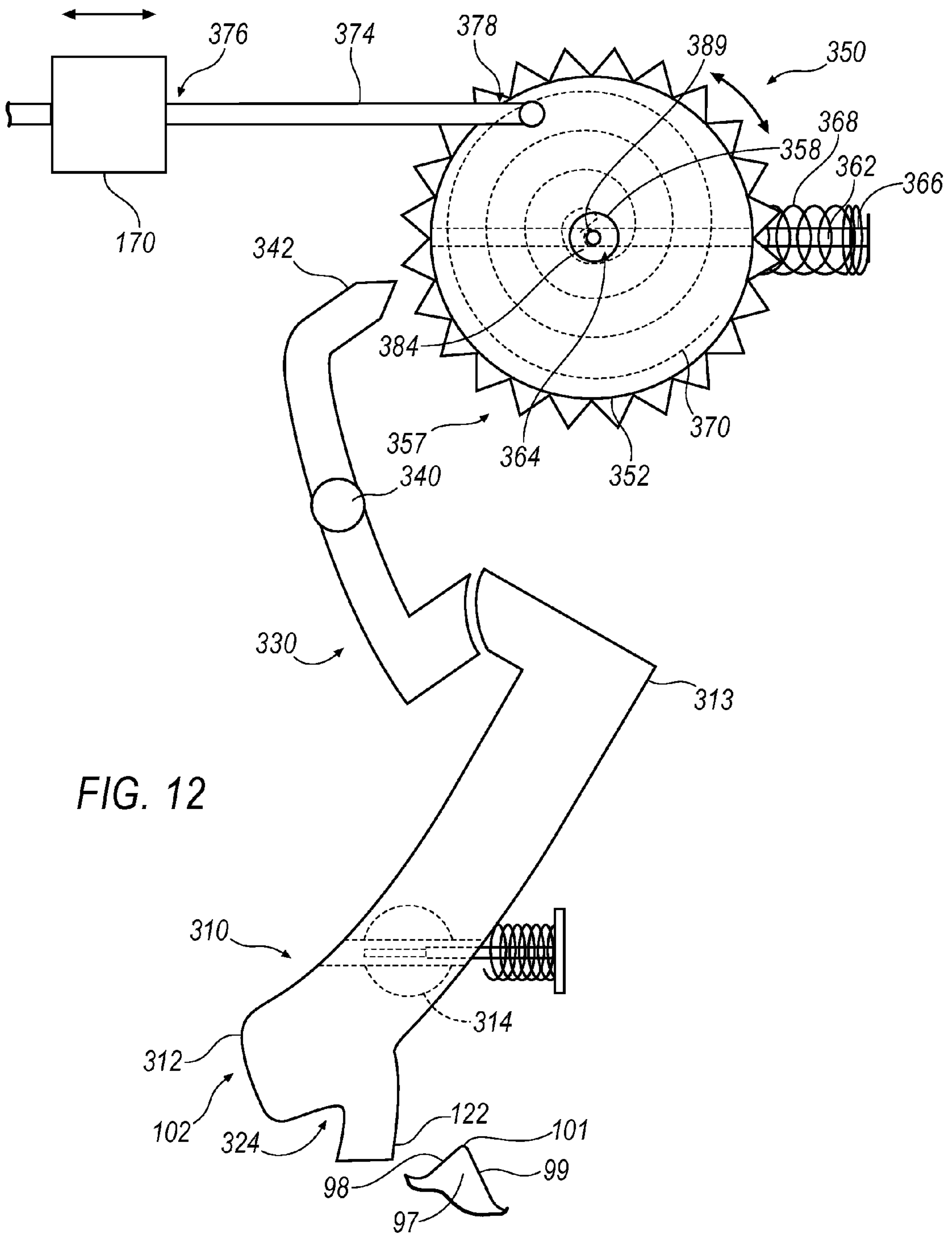
FIG. 12 is an exploded cross-sectional view of the components contained within the epoxy injection controller of FIG. 9 with the trigger in the unlocked position.

Next, a cartridge 40 is inserted or loaded into the epoxy injection controller 300. After the cartridge 40 has been loaded, the epoxy injection controller 300 is brought to the delivery site for the epoxy such that the needle 47 of the cartridge 40 is proximate the delivery site. The second end 313 of trigger 310 is then pulled towards the handle 80 such that the trigger 310 is released from engagement with tooth 97 on the trigger guard 94, and the trigger 310 rotates in a clockwise direction about the trigger guide pivot member 314. As the trigger 310 is no longer locked, the link member 330 is unlocked, and free to rotate about pivot member 340 in a counter-clockwise direction. When link member 330 rotates about pivot member 340 in a counter-clockwise direction, projection 342 is withdrawn from engagement with tooth 357. With projection 342 disengaged from tooth 357, the torque provided by winding spring 370 to disc 352 forces disc 352 to rotate counter-clockwise about disc guide pivot member 384. As disc 352 rotates counter-clockwise, connection member 374 translates toward the cartridge 40, which forces plunger carrier 170 to also translate towards the cartridge 40 as shown in FIG. 12. This forces the depression of plunger 50 within barrel 42 such that epoxy begins to flow from needle 47 to the delivery site.

When a sufficient quantity of epoxy has been delivered to the delivery site, the first end 312 of trigger 310 may again be pulled towards the handle 80 and rotated counter-clockwise about trigger guide pivot member 314. Link member 330 is forced to rotate clockwise about pivot member 340, drawing projection 342 into engagement with a tooth 357 on disc 352. The engagement of the projection 342 with a tooth 357 arrests the counter-clockwise rotation of disc 352, and thus also arrests the translation of plunger carrier 170 towards the cartridge 40. Further clockwise rotation of link member 330 forces the projection 342 further into contact with tooth 357 such that the rotation of link member 330 forces disc guide 380 to translate along guide member 362, thus translating disc 352 towards rear wall 32, compressing spring 368. As plunger carrier 170 is connected to disc 352 via connection member 374, the rearward translation of disc 352 also forces plunger carrier 170 to retract towards rear wall 32. The retraction of plunger carrier 170 stops the flow of epoxy from the cartridge 40. Trigger 310 is then lockingly engaged with tooth 97 on trigger guard 94.

Figure 13:
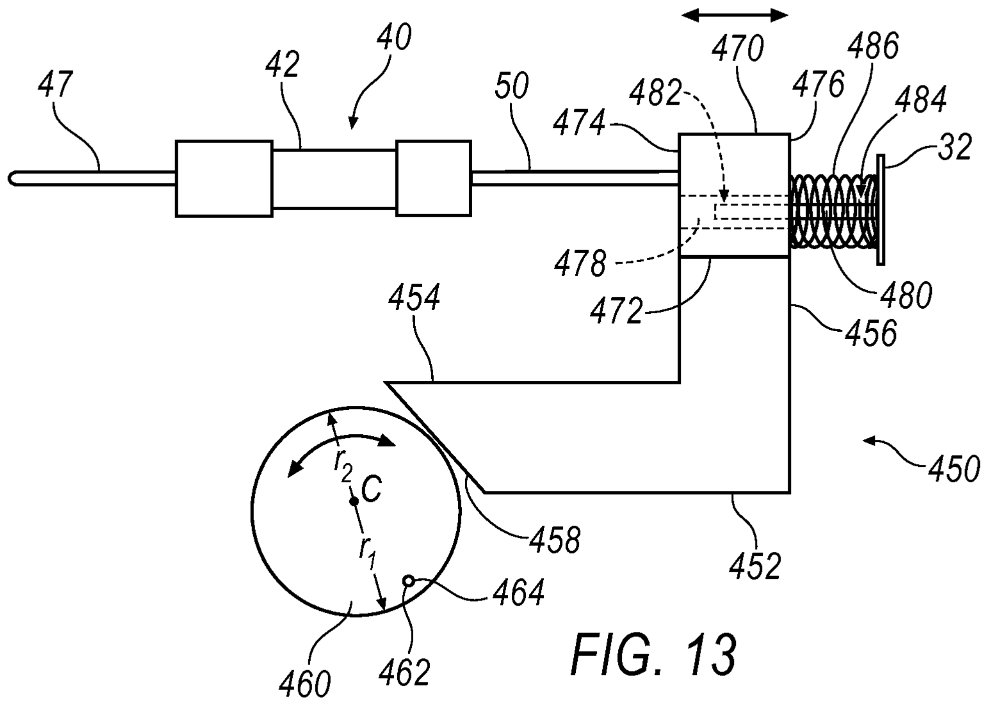
FIG. 13 an exploded cross-sectional view of an alternate illustration of an actuator for the epoxy injection controller of FIG. 9.

Another exemplary illustration of an actuator 450 for an epoxy injection controller is shown in FIG. 13. In the exemplary illustration, actuator 450 may be operated electronically. Actuator 450 may include a drive member 452 including a first end 454 and a second end 456. The second end 456 of drive member 452 may be connected to the base 472 of plunger carrier 470. The first end 454 of drive member 452 may be tapered and include a tapered edge 458.

Actuator 450 may also include a disc 460 including a disc bore 462 extending through the disc 460. Disc bore 462 may be offset from the center C of disc 460, such as proximate the circumference of disc 460. As illustrated, radius $r_2$ is less than the radius $r_1$. Disc bore 462 is sized and configured to receive a pivot member 464 such that disc 460 can rotate about pivot member 464. Pivot member 464 may be a generally cylindrical tube and may be connected to the inner surfaces 20, 22, of housing body 14.

Plunger carrier 470 may include a carrier bore 478 extending through plunger carrier 470 from the first end 474 to the second end 476 of plunger carrier 470. Carrier bore 478 may be sized and configured to receive a guide member 480, which may be a generally cylindrical tube having a first end 482 and a second end 484. The second end 484 of guide member 480 may be connected to the rear wall 32 of housing body 14. A spring 486 may be disposed about the guide member 480 and connected on one end to the second end 476 of plunger carrier 470 and the other end to the rear wall 32 of housing body 14. The first end 482 of guide member 480 may be received in carrier bore 478 such that plunger carrier 470 may translate along the guide member 480.

In operation, a trigger (not shown) may be activated, engaging a motor (not shown) to rotate disc 460 in a clockwise direction about pivot member 464. As pivot member 464 is offset from the center C of disc 460, the clockwise rotation of disc 460 forces disc 460 into tapered edge 458 of drive member 452, which translates drive member 452 and plunger carrier 470 along guide member 480 towards rear wall 32 of housing body 14, compressing spring 486. Disc 460 may then be electronically locked, keeping plunger carrier 470 under tension due to the compression of spring 486.

Next, a cartridge 40 of epoxy may be loaded into the epoxy injection controller. After the cartridge 40 has been loaded, the trigger may again be activated, unlocking disc 460. The torque experienced by plunger carrier 470 due to the compression of spring 486 then forces plunger carrier 470 away from rear wall 32 and into disc 460, causing disc 460 to rotate about pivot member 464 in a counter-clockwise direction. The torque experienced by plunger carrier 470 may force drive member 452 to translate along guide member 480 towards the cartridge 40. This depresses plunger 50 within barrel 42 of cartridge 40 such that epoxy begins to flow from needle 47 to the delivery site.

When a sufficient quantity of epoxy has been delivered to the delivery site, the trigger may be engaged, activating the motor to rotate disc 460 in a clockwise direction about pivot member 464, arresting the translation of plunger carrier 470 towards the cartridge 40. Further clockwise rotation of disc 460 forces plunger carrier 470 to translate along guide member 480 towards rear wall 32, retracting the plunger contained within plunger carrier 470 from cartridge 40. The translation of plunger carrier 470 towards rear wall 32 stops the flow of epoxy from the cartridge 40. Disc 460 is then locked electronically from further rotation.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in now way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as "a," "the," "said," etc. should be read to recite one or more of the indicated elements unless a claim recites an explicit limitation to the contrary.

What is claimed is:

1. An epoxy injection controller comprising:

a housing including a housing body and a handle, the housing body having a front wall, opposing side walls, a bottom wall, and a rear wall, and the handle including a front wall;

a cartridge holder configured to receive a cartridge of material disposed within the housing;

a trigger guard extending from the bottom wall of the housing body to the front wall of the handle, the trigger guard having an inner surface including at least one tooth disposed on the inner surface;

a trigger selectively engageable between a locked position and an unlocked position, wherein the trigger includes a first end and a second end, at least a portion of the second end of the trigger disposed within the housing;

an actuator for dispensing the material from the cartridge; and a link member having a first end and a second end disposed within the housing, the first end of the link member in selective engagement with the second end of the trigger, wherein when the trigger is in the unlocked position, the actuator dispenses material from the cartridge, and when the trigger is in the locked position, the actuator is retracted from the cartridge and prevented from dispensing material from the cartridge.

2. The epoxy injection controller of claim 1, wherein the second end of the link member includes a projection selectively engageable with the actuator.

3. The epoxy injection controller of claim 1, wherein the trigger includes a finger projecting from the first end of the trigger, and a cavity defined between the finger and the first end of the trigger, the cavity configured for engagement with the at least one tooth.

4. The epoxy injection controller of claim 1, wherein the trigger includes a trigger bore and a trigger guide including a trigger guide base and a trigger guide pivot member, the trigger bore configured to receive the trigger guide pivot member such that the trigger can rotate about the trigger guide pivot member.

5. The epoxy injection controller of claim 4, wherein the trigger guide base includes a trigger guide bore, the trigger guide bore configured to receive a guide member having a first end and a second end, the first end of the guide member disposed within the trigger guide bore, the second end of the guide member connected to a spring mount connected to the front face of the handle.

6. The epoxy injection controller of claim 1, wherein the cartridge is a syringe including a barrel having a first end and a second end, a tip at the first end of the barrel, a needle extending from the tip, a barrel base and the second end of the barrel, and a plunger including a plunger tip and a plunger base received within the barrel.

7. The epoxy injection controller of claim 1, wherein the material in the cartridge is an epoxy.

8. The epoxy injection controller of claim 1, wherein the actuator includes a disc having a front face and a rear face, a connection member having a first end and a second end, the second end of the connection member pivotally connected to the front face of the disc, and a plunger carrier having a first end, a second end, and a plunger base cavity configured to receive a plunger base of a cartridge, the second end of the plunger carrier connected to the first end of the connection member.

9. The epoxy injection controller of claim 1, further comprising a housing cover sealing the cartridge holder within the housing.

10. The epoxy injection controller of claim 2, wherein the actuator includes a disc including a plurality of teeth about a circumference of the disc, the plurality of teeth configured for selective engagement with the projection of the link member.

11. The epoxy injection controller of claim 10, wherein when the trigger is in the unlocked position, the projection is configured to disengage with one of the teeth and the disc is configured to rotate counter-clockwise, and when the trigger is in locked position, the projection is configured to engage with another of the teeth preventing the disc from rotating counter-clockwise.

12. An epoxy injection controller comprising:

a housing including a housing body and a handle, the housing body having a front wall, opposing side walls, a bottom wall, and a rear wall, and the handle including a front wall;

a cartridge holder configured to receive a cartridge of material disposed within the housing;

a trigger selectively engageable between a locked position and an unlocked position;

an actuator for dispensing the material from the cartridge, the actuator selectively engaged with the trigger;

wherein when the trigger is in the unlocked position, the actuator dispenses material from the cartridge, and when the trigger is in the locked position, the actuator is retracted from the cartridge and prevented from dispensing material from the cartridge, wherein the trigger includes a trigger bore and a trigger guide including a trigger guide base and a trigger guide pivot member, the trigger bore configured to receive the trigger guide pivot member such that the trigger can rotate about the trigger guide pivot member, and wherein the trigger guide base includes a trigger guide bore, the trigger guide bore configured to receive a guide member having a first end and a second end, the first end of the guide member disposed within the trigger guide bore, the second end of the guide member connected to a spring mount connected to the front face of the handle.

13. The epoxy injection controller of claim 12, further including an adjustment spring disposed about the guide member, the adjustment spring connected on one end to the trigger guide base and on the other end to the spring mount.

14. An epoxy injection controller comprising:

a housing including a housing body and a handle, the housing body having a front wall, opposing side walls, a bottom wall, and a rear wall, and the handle including a front wall;

a cartridge holder configured to receive a cartridge of material disposed within the housing;

a trigger selectively engageable between a locked position and an unlocked position; and an actuator for dispensing the material from the cartridge, the actuator selectively engaged with the trigger, wherein when the trigger is in the unlocked position, the actuator dispenses material from the cartridge, and when the trigger is in the locked position, the actuator is retracted from the cartridge and prevented from dispensing material from the cartridge, and wherein the actuator includes a disc having a front face and a rear face, a connection member having a first end and a second end, the second end of the connection member pivotally connected to the front face of the disc, and a plunger carrier having a first end, a second end, and a plunger base cavity configured to receive a plunger base of a cartridge, the second end of the plunger carrier connected to the first end of the connection member.

15. The epoxy injection controller of claim 14, wherein the actuator further includes a disc guide including a disc guide base having a front surface, a rear surface, and an outer surface defined between the front surface and the rear surface, and a disc guide pivot member extending from the front surface of the disc guide base.

16. The epoxy injection controller of claim 15, further including a winding spring disposed on the rear face of the disc, the winding spring including a spring base connected to the front surface of the disc guide base.

17. The epoxy injection controller of claim 15, wherein the disc includes a disc bore extending through the front and rear faces of the disc, the disc bore configured to receive the disc guide pivot member such that the disc can rotate about the disc guide pivot member.

18. The epoxy injection controller of claim 17, wherein the disc guide base includes a disc guide bore, the disc guide bore configured to receive a guide member having a first end and a second end, the first end of the guide member disposed within the disc guide bore, the second end of the guide member connected to the rear wall of the housing body.

19. The epoxy injection controller of claim 18, further including a spring disposed about the guide member, the spring connected on one end to the disc guide base and on the other end to the rear wall of the housing body.

20. The epoxy injection controller of claim 19, wherein the disc includes a plurality of teeth about the circumference of the disc, the plurality of teeth configured for selective engagement with the second end of the link member.

* * * * *